United States Patent [19]

Iwaszkowiec

[11] Patent Number: 5,009,369

[45] Date of Patent: Apr. 23, 1991

[54] SPRAY SHIELD UNIT

[75] Inventor: Carlos Iwaszkowiec, St. Peters, Mo.

[73] Assignee: Monsanto Company, St. Louis, Mo.

[21] Appl. No.: 481,099

[22] Filed: Feb. 16, 1990

[51] Int. Cl.[5] .......... B05B 15/04; B05B 1/28

[52] U.S. Cl. .......... 239/223; 239/288.5; 172/17; 47/1.7

[58] Field of Search .......... 239/150, 151, 223, 224, 239/230–232, 741, 344, 754, 288, 288.3, 288.5; 47/1.5, 1.7; 172/11, 17

[56] References Cited

U.S. PATENT DOCUMENTS

| | | | |
|---|---|---|---|
| 2,673,090 | 3/1954 | Blumberg | 239/223 X |
| 2,904,259 | 9/1959 | Heard | 239/223 X |
| 2,951,314 | 9/1960 | Laughlin | 47/1.7 X |
| 3,229,913 | 1/1966 | Waldrum | 239/223 X |
| 3,237,346 | 3/1968 | Watts | 47/1.7 |
| 3,658,248 | 4/1972 | Williams | 239/741 X |
| 3,687,371 | 8/1972 | Swagen | 239/150 |
| 3,796,353 | 3/1974 | Smrt | 222/176 |
| 3,872,930 | 3/1975 | Campbell | 172/17 X |
| 3,903,842 | 9/1975 | Bowling | 118/301 |
| 4,345,544 | 8/1982 | Besecker | 118/108 |
| 4,524,912 | 6/1985 | Jones | 239/150 |
| 4,545,531 | 10/1985 | Williams | 239/150 |
| 4,624,602 | 11/1986 | Kieffer et al. | 404/94 |
| 4,641,780 | 2/1987 | Smrt | 239/150 |

FOREIGN PATENT DOCUMENTS

| | | | |
|---|---|---|---|
| 111049 | 10/1938 | Australia | 239/150 |
| 489066 | 2/1918 | France | 47/1.7 |

*Primary Examiner*—Andres Kashnikow
*Assistant Examiner*—Kevin Weldon

[57] ABSTRACT

A spray shield unit adapted to be mounted on the head of a sprayer where the head has a spinner thereon rotatable about an axis for spraying liquid generally radially outwardly with respect to said axis. The spray shield unit comprises a hub having an opening therein for receiving the head of the sprayer, and a generally planer circular shield member mounted on the hub generally coaxial with the hub and projecting radially outwardly from the hub for shieldling spray emitted by the spinner from the wind. The shield member is rotatable on the hub generally on the central axis of the hub opening whereby when the spray shield unit is mounted on the head of the sprayer and when the sprayer is held with the spinner axis generally horizontal, the shield member may be rolled on the ground to maintain the head of the sprayer in the hub opening a fixed vertical distance from the ground to provide a uniform distribution of spray onto the ground.

14 Claims, 2 Drawing Sheets

SPRAY SHIELD UNIT

BACKGROUND OF THE INVENTION

This invention relates generally to spraying apparatus for applying herbicides, for example, and more particularly to a unit which is adapted to be releasably mounted on the head of a sprayer for shielding spray emitted by the sprayer from the wind, and for enabling a more uniform relatively narrow-width distribution of the spray on the ground.

This invention has particular (albeit not exclusive) application to sprayers of the type shown in Gill U.S. Pat. No. 4,609,148 where the sprayer comprises a relatively long tube connected at one end to a supply of liquid to be sprayed, a spray head at the other end of the tube, and a rotatable disc or spinner mounted on the head for spraying liquid generally radially outwardly relative to the axis of rotation of the spinner. In use, a sprayer of this type is typically held in a position where the axis of the spinner is generally vertical so that the liquid being sprayed is flung outwardly in a generally circular horizontal pattern. While the sprayer is typically adjustable to vary the diameter of this pattern, it has heretofore not been adjustable to provide a very small-diameter pattern (e.g., two inches or less) useful in spraying sidewalk cracks and in edging. One solution to this problem is to hold the tube so the spinner axis is generally horizontal and liquid is flung outwardly by the spinner in a generally vertical plane with the spray pattern having a horizontal dimension or width of about two inches or less. However, this pattern is especially susceptible to being blown sideways by the wind, which could result in application of the liquid to areas where it is undesirable.

SUMMARY OF THE INVENTION

Among the several objects of this invention may be noted the provision of a spray shield unit for removable mounting on the spray head of a sprayer of the type described above; the provision of such a unit which effectively shields the spray emitted by the sprayer from the wind, thereby enabling a more controlled application of the spray; the provision of such a unit which is capable of maintaining the spray head a fixed distance from the ground to provide for a more uniform distribution of the spray onto the area being sprayed; the provision of such a unit which is readily applied to and removable from the head of a sprayer; the provision of such a unit which is safe and efficient to use; and the provision of such a unit which is relatively economical to manufacture.

Briefly, a spray shield unit of the present invention is adapted to be mounted on the head of a sprayer where the head has a spinner thereon rotatable about an axis for spraying liquid generally radially outwardly with respect to the axis. The spray shield unit comprises a hub having an opening therein for receiving the head of the sprayer. The hub opening has a central axis. The unit also includes a generally planer circular shield member mounted on the hub generally coaxial with the hub and projecting radially outwardly from the hub for shielding spray emitted by the spinner from the wind. The shield member is rotatable on the hub generally on the central axis of the hub opening whereby when the spray shield unit is mounted on the head of the sprayer and when the sprayer is held with the spinner axis generally horizontal, the shield member may be rolled on the ground to maintain the head of the sprayer in the hub opening a fixed vertical distance from the ground to provide a uniform distribution of spray onto the ground.

Other objects and features will be in part apparent and in part pointed out hereinafter.

BRIEF DESCRIPTION OF THE DRAWINGS

Corresponding parts are designated by corresponding reference numerals throughout the several views of the drawings.

DESCRIPTION OF THE PREFERRED EMBODIMENT

Figure 1:
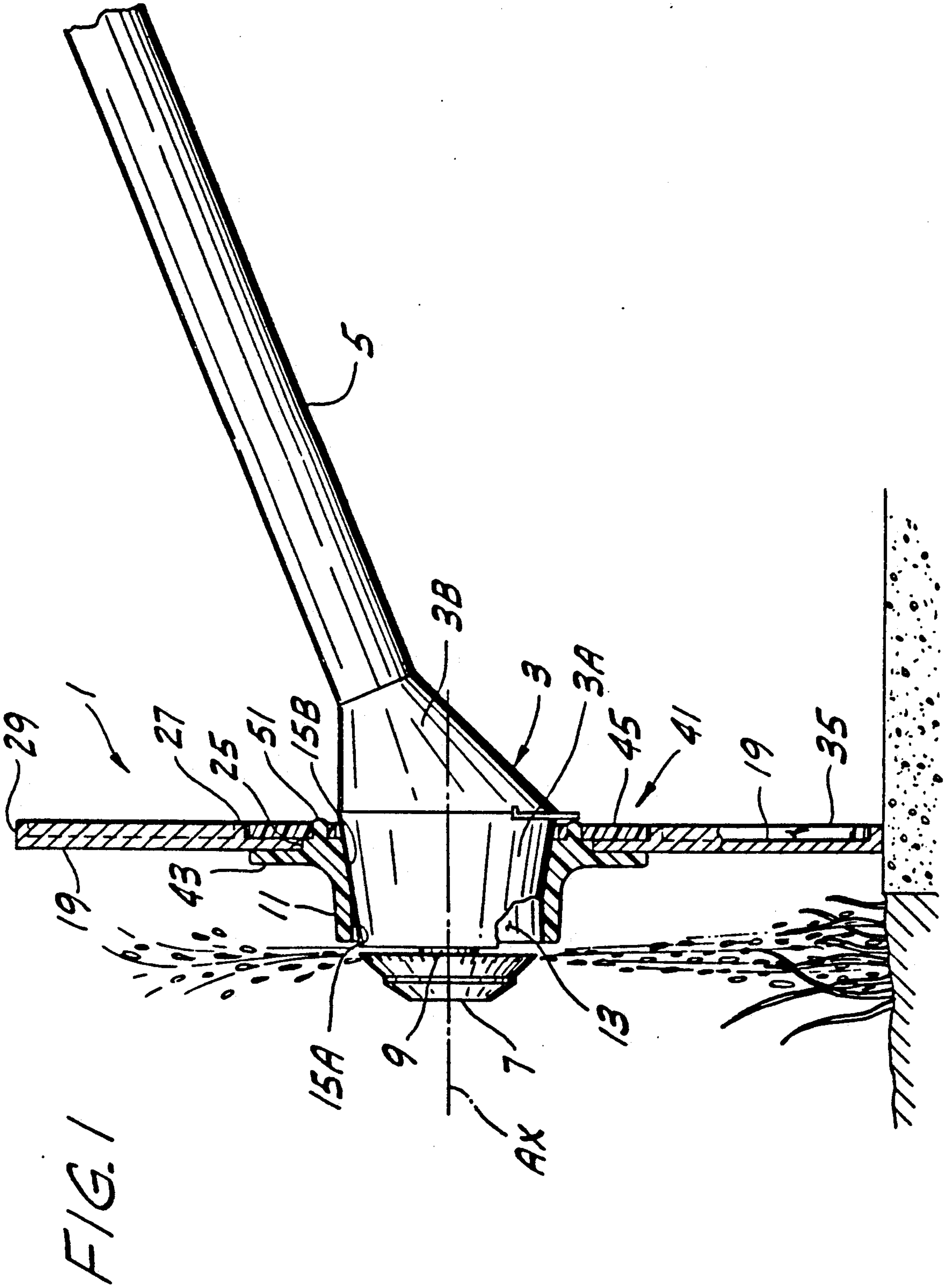
FIG. 1 is a sectional view showing a spray shield unit of the present invention mounted on the head of a sprayer.
Figure 3:
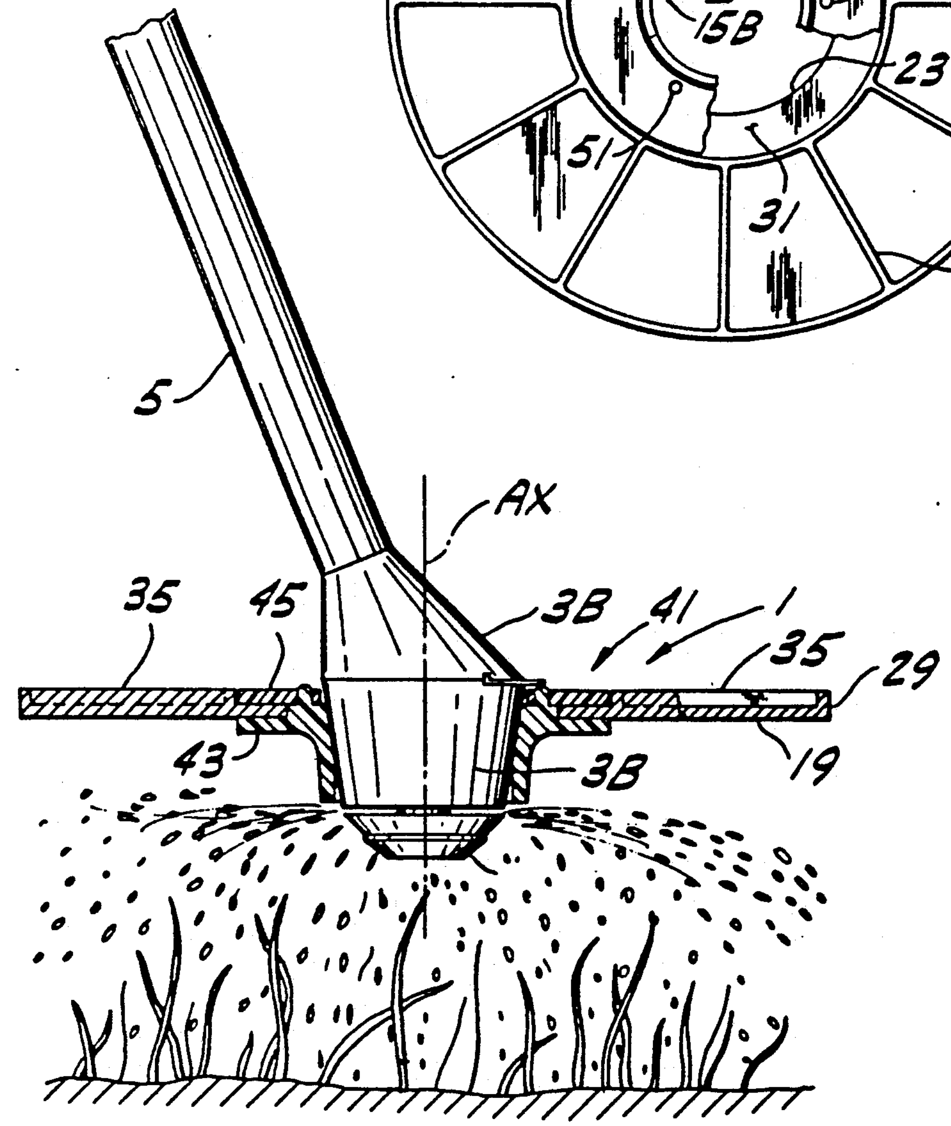
FIG. 3 is a view showing the sprayer held in a different orientation.

Referring now to the drawings, and first more particularly to FIG. 1, a spray shield unit of the present invention, indicated in its entirety at 1, is shown mounted on the spray head 3 at one end of a spray tube 5 of a sprayer. As shown, the spray head has a frustum-shaped front section 3A and a tapered rear transitional section 3B interconnecting the lower end of the tube 5 and the front section 3A. A spinner 7 in the form of a circular concave disc is mounted on a shaft 9 projecting forward from the head for rotation about an axis AX which is generally coaxial with the front section 3A of the head. The shaft 9 and spinner 7 thereon are rotated at high speeds by a suitable mechanism (not shown). Liquid to be sprayed (e.g., herbicide) is suitably delivered from the head to the spinner and flung generally radially outwardly (relative to axis AX) from the spinner in a generally circular spray pattern. In normal use, the sprayer is held in a position where the axis AX of the spinner is generally vertical, as shown in FIG. 3, so that spray from the spinner is flung generally horizontally outwardly in a circular pattern. When used in this fashion, the spray pattern is of relatively large diameter (six inches or more) and thus inappropriate for narrow-width (two inches or less) applications, such as spraying sidewalk cracks and edging. It has been found, however, that if the sprayer is used in a position where the axis AX is generally horizontal, as shown in FIG. 1, a narrow-width pattern of spray may be dispensed. The spray shield unit 1 of this invention is particularly useful when the sprayer is used in this manner for shielding the vertical spray pattern from the wind to prevent undesirable sideways blowing of the spray.

The shield unit 1 comprises a tubular hub 11 of molded plastic, for example, having an opening 13 therethrough for receiving the front section 3A of the head of the sprayer. The hub opening 13 has a central axis generally parallel to or coincident with the spinner axis AX (they are illustrated as being coincident) when the head of the sprayer is received in the hub opening 13. The inside wall of the hub has two sections, a generally cylindric front section 15A and a tapered rear section 15B which is adapted for a sliding friction fit with the outer surface of the front section 3A of the spray head to removably mount the shield unit on the spray head. The exterior of the spray head and/or inside wall of the hub may be provided with gripping elements (e.g., ribs or dimples) for increasing the holding power between these two surfaces.

Figure 2:
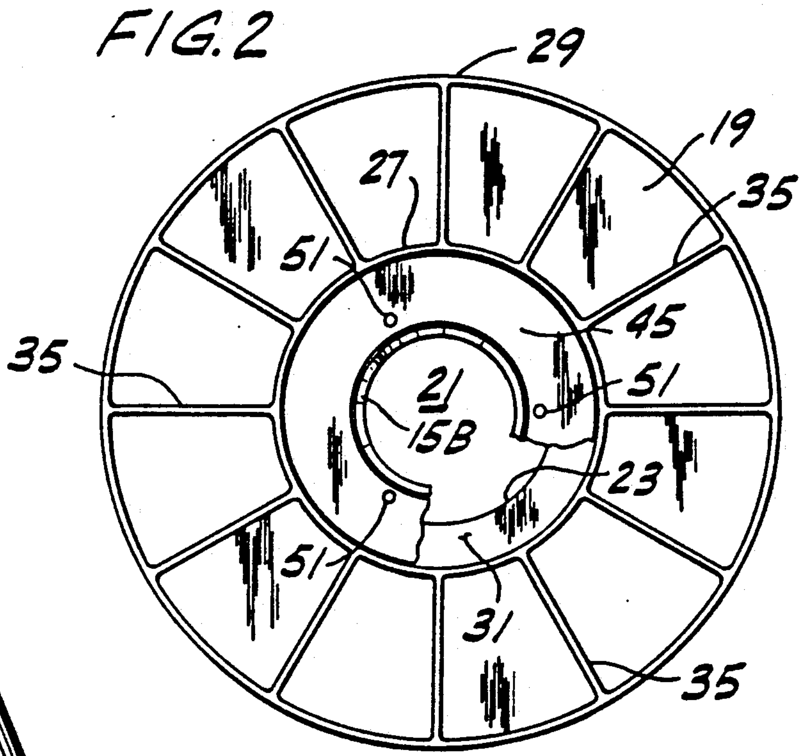
FIG. 2 is an elevational view of FIG. 1 showing the shield unit.

The unit also comprises a generally planar shield member 19 in the form of a circular disc or wheel having a central circular opening 21 therein bounded by an inner edge 23 which is rotatably engageable with a cylindric bearing surface 25 on the hub. The shield member 19 has inner and outer circular rims 27, 29 projecting rearwardly therefrom generally concentric with the opening, the inner rim being spaced radially outwardly from the inner edge 23 of the opening to define an annular space indicated at 31. The outer rim 29 defines the outer edge of the disc 19. A plurality of reinforcing ribs 35 extend radially between the two rims 27, 29 at spaced intervals around the disc (see FIG. 2). The shield member 29 is preferably of molded plastic (the same as the hub 11), although it may be of other suitable materials. The shield member preferably has a diameter somewhat greater than the diameter of the smallest-diameter spray pattern capable of being emitted by the spinner 7. For example, if the smallest-diameter spray pattern is six inches, the shield member 19 may have a diameter of eight inches, which will ensure that the entire spray pattern is shielded from the wind when the sprayer is used as shown in FIG. 1.

Means indicated generally at 41 is provided for holding the shield member 19 on the hub 11. This means comprises a pair of annular retainers indicated at 43 and 45 on the hub generally coaxial with the hub and projecting radially outwardly from the hub. The retainers are spaced apart a distance only slightly greater than the thickness of the shield member adjacent the central opening 21 for retaining the shield member therebetween while permitting the shield member to rotate freely on the hub. More specifically, one retainer, indicated at 43, comprises an annular flange integrally formed with the hub and projecting outwardly from the thickened portion of the hub adjacent the rear end of the hub immediately forward of the bearing surface 25. The other retainer, indicated at 45, comprises a separate annular retaining member or ring secured to the hub and received in the annular recess 31 of the shield member. The retaining ring 45 is secured to the hub 11 by means of a plurality of locking pins 51 integrally formed with the hub and projecting rearwardly therefrom through holes in the ring. The ends of these pins may be deformed (with heat, for example) to prevent their withdrawal from respective openings, thereby securing the ring to the hub and thus holding the shield member 19 in place on the hub. The thickness of the retaining ring 45 is approximately equal to the height of the inner rim 27 on the shield member so that the ring is generally flush with the rim. It will be understood that other suitable means may be used to secure the ring to the hub without departing from the scope of this invention.

In use, the shield unit 1 is installed on the sprayer by sliding the hub 11 on the front section 3A of the spray head 3 until the tapered rear surface 15B of the hub grips the spray head with sufficient force to hold the unit securely on the spray head. After adjusting the sprayer so that the spinner 7 will emit a minimum diameter (e.g., six inch) spray pattern, the sprayer is held in a position where the axis of rotation AX of the spinner is generally horizontal and the outer rim 29 of the shield member 19 is in contact with the ground (or other surface to be sprayed), as shown in FIG. 1. The spinner is then actuated and the person holding the sprayer moves forward, causing the shield member 19 to rotate on the hub 11 with its outer rim in rolling contact with the ground. This ensures that the spray pattern is shielded from blowing sideways by the wind. Moreover, the shield member maintains the head 3 of the sprayer a fixed distance from the ground to provide for a uniform narrow-width distribution of spray onto the ground. The shield unit is also useful when the sprayer is held in more conventional fashion, that is, with the spinner axis AX generally vertical (see FIG. 3). For example, in a situation where vegetation to be controlled underlies the foliage of a plant, the shield member 19 may be positioned between the vegetation and foliage to shield the foliage from the spray. When the shield unit 1 is no longer needed, it is readily removable from the spray head simply by sliding the hub 11 forwardly off the head 3.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A spray shield unit adapted to be mounted on the head of a sprayer, said head having a spinner thereon rotatable about an axis for spraying liquid generally radially outwardly with respect to said axis, said spray shield unit comprising:

a hub having an opening therein for receiving the head of the sprayer, said hub opening having a central axis; and a generally planer circular shield member mounted on the hub generally coaxial with the hub and projecting radially outwardly from the hub for shielding spray emitted by the spinner from the wind;

said shield member being rotatable on the hub generally on the central axis of the hub opening whereby when the spray shield unit is mounted on the head of the sprayer and when the sprayer is held with the spinner axis generally horizontal, the shield member may be rolled on the ground to maintain the head of the sprayer in the hub opening a fixed vertical distance from the ground to provide a uniform distribution of spray onto the ground.

2. A spray shield unit as set forth in claim 1 further comprising means for holding the shield member on the hub.

3. A spray shield unit as set forth in claim 2 wherein said shield member is annular in shape, having a generally circular inner edge engageable with the hub and a generally circular outer edge.

4. A spray shield unit as set forth in claim 3 wherein said means for holding the shield member on the hub comprises a pair of annular retainers on the hub generally coaxial with the hub and projecting radially outwardly from the hub, said retainers being spaced apart a distance only slightly greater than the thickness of the shield member for retaining the shield member therebetween while permitting the shield member to rotate freely on the hub.

5. A spray shield unit as set forth in claim 4 wherein one retainer comprises an annular flange integrally formed with the hub and the other retainer comprises an annular retaining member secured to the hub.

6. A spray shield unit as set forth in claim 5 wherein said hub has a plurality of pins projecting through holes in said annular retaining member thereby to secure the retaining member to the hub.

7. A spray shield unit as set forth in claim 1 wherein said hub and shield member are of molded plastic.

8. In combination with a sprayer comprising a spray head having a spinner thereon rotatable about an axis for spraying liquid generally radially outwardly with respect to said axis, a spray shield unit adapted to be mounted on the head comprising:

a hub having an opening therein for receiving the head of the sprayer, said hub opening having a central axis; and a generally planer circular shield member mounted on the hub generally coaxial with the hub and projecting radially outwardly from the hub for shielding spray emitted by the spinner from the wind;

said shield member being rotatable on the hub generally on the central axis of the hub opening whereby when the spray shield unit is mounted on the head of the sprayer and when the sprayer is held with the spinner axis generally horizontal, the shield member may be rolled on the ground to maintain the head of the sprayer in the hub opening a fixed vertical distance from the ground to provide a uniform distribution of spray onto the ground.

9. A combination as set forth in claim 8 further comprising means for holding the shield member on the hub.

10. A spray shield unit as set forth in claim 9 wherein said shield member is annular in shape, having a generally circular inner edge engageable with the hub and a generally circular outer edge.

11. A combination as set forth in claim 10 wherein said means for holding the shield member on the hub comprises a pair of annular retainers on the hub generally coaxial with the hub and projecting radially outwardly from the hub, said retainers being spaced apart a distance only slightly greater than the thickness of the shield member for retaining the shield member therebetween while permitting the shield member to rotate freely on the hub.

12. A combination as set forth in claim 11 wherein one retainer comprises an annular flange integrally formed with the hub and the other retainer comprises an annular retaining member secured to the hub.

13. A combination as set forth in claim 12 wherein said hub has a plurality of pins projecting through holes in said annular retaining member thereby to secure the retaining member to the hub.

14. A combination as set forth in claim 1 wherein said hub and shield member are of molded plastic.

* * * * *